Feb. 18, 1958     I. BROWNING ET AL     2,823,835
DISPENSING DEVICES
Filed June 22, 1954
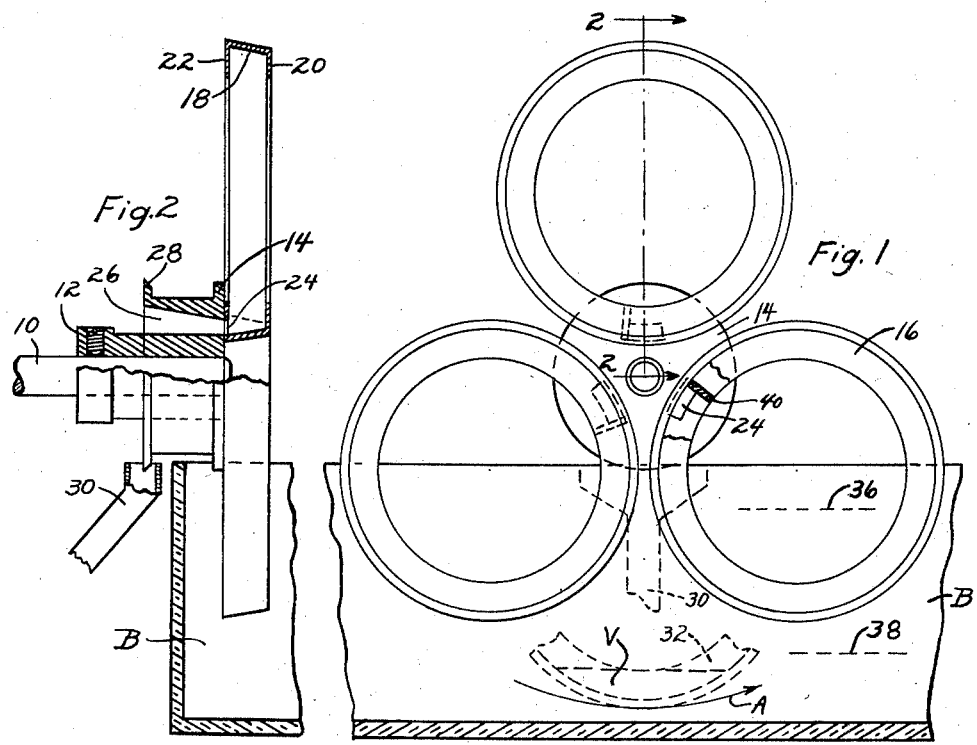
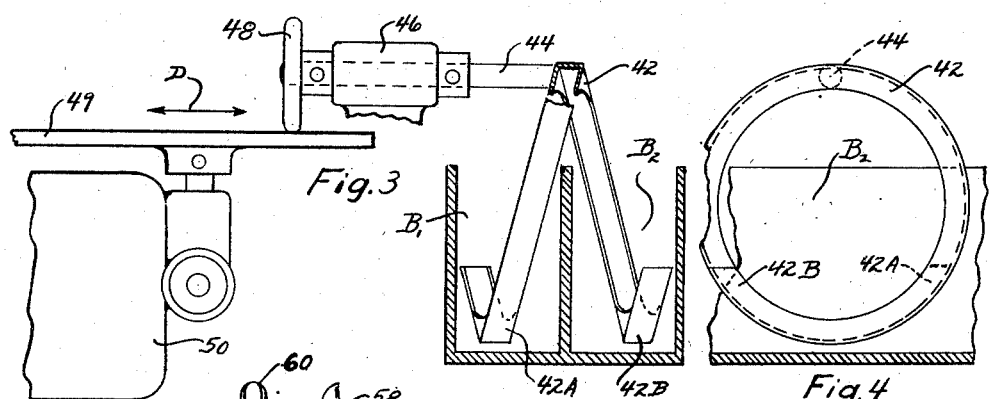
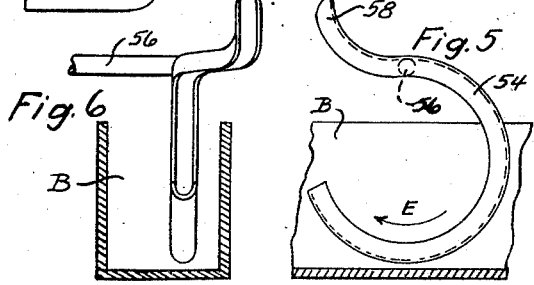
INVENTORS
IBEN BROWNING
LLOYD S. LOCKINGEN
By Noble S. Williams
ATTORNEY

United States Patent Office 2,823,835
Patented Feb. 18, 1958

2,823,835
DISPENSING DEVICES

Iben Browning, Tonawanda, N. Y., and Lloyd S. Lockingen, Austin, Tex.

Application June 22, 1954, Serial No. 438,433

7 Claims. (Cl. 222—254)

This invention relates to dispensing apparatus and more particularly to apparatus for dipping or metering accurate amounts of liquid material from a reservoir or the like at any exact preselected rate within a relatively wide operating range.

It has been found heretofore difficult at times to provide means for dispensing from a reservoir or other source of supply liquid material in exact predetermined amounts and at any exact preselected rate notwithstanding the fact that the amount or level of the material within the container, reservoir or source of supply may vary considerably. Various types of dispensing and metering devices are known but same have not proved too satisfactory for various reasons.

One known form of dispensing device, for example, employed a variable orifice communicating with a reservoir but functioning of such orifices were often subject to variations in level of the material within the reservoir as well as subject to variations in cross-section diameter due, for example, to the fact that certain materials will gradually form coatings upon the interior wall portions of the container and the metering orifice and thereby restrict and slow down the rate of discharge through the orifice. Other types of dispensing devices having rotatable members carrying a plurality of dipping cups have not been satisfactory because the unit amount of material collected for transfer each time a cup of the device dipped into the material varied in accordance with variations in the level of the material in the container or reservoir, and accordingly materially affected the accuracy with which the material was transferred or dispensed.

The dispensing apparatus of the present invention, however, is of such a construction and arrangement that notwithstanding the fact that the level of the source of the supply of liquid material to be transferred or metered from a supply container or reservoir may vary somewhat, the amount being extracted may be accurately controlled at substantially any preselected rate over a relatively wide operating range.

It is, accordingly, an object of the present invention to provide a dispensing or metering apparatus whereby an exact predetermined amount of liquid material may be withdrawn from a reservoir or container and supplied to a discharge conduit or the like at any exact predetermined rate within a relatively wide operating range.

It is an additional object of the present invention to provide a dispensing or metering device of the character described and which is of a reversible character so that material may be transferred accurately from a first container to a second one, or reversed for transfer of material from the second to the first.

It is a further object of the present invention to provide an apparatus of the character described which is of simple and inexpensive construction but nevertheless highly efficient and accurate in its dispensing or metering operation, and which apparatus will function economically over long periods of time without requiring attention or servicing.

Other objects and advantages of the invention will become apparent from the detailed description which follows when taken in conjunction with the accompanying drawings, in which:

Fig. 1 is a side elevational view, partly in section and partly broken away, of a dispensing or metering apparatus embodying the present invention;

Fig. 2 is a front elevational view, partly in section and partly broken away, of the apparatus of Fig. 1;

Fig. 3 is a front elevational view of a modified form of the improved dispensing apparatus shown in combination with driving apparatus therefor, parts of said structure being shown in section and other parts thereof broken away;

Fig. 4 is a side elevational view, partly in section and partly broken away, of a part of the structure of Fig. 3;

Fig. 5 is a side elevational view, partly in section, of a modified form of the apparatus; and Fig. 6 is a front elevational view, partly in section, of the apparatus of Fig. 5.

In Figs. 1 and 2, there is disclosed a rotatable shaft 10 having a cylindrical hub or carrier 12 secured thereon and this hub or carrier is provided with an end flange 14 to which are secured by soldering, brazing, or the like, a plurality of dispensing or dipping units 16. Each dispensing unit is in the form of circular trough which is U-shaped in cross section and formed by an intermediate wall or central bite portion 18 and a pair of sidewalls 20 and 22 secured thereto. The bite portion 18, it will be noted from Fig. 2, is sloped slightly to one side. The purpose for this is so that after a dispensing unit 16 has dipped into the material in the reservoir to be metered and has moved or swings on around to its upper discharge position the liquid material contained within the elongated bottom portion of the trough will gravitate laterally along this sloping wall portion and will be discharged outwardly through an opening 24 formed in the sidewall 22. The opening 24 communicates with a passageway 26 formed in an enlarged portion of the hub 12 and, accordingly, the material can flow outwardly therethrough. The opposite end of this enlarged portion of the hub is provided with a circular flange 28 which is disposed above a discharged conduit or the like 30.

Thus, during rotation of the shaft 10 in the direction indicated by the arrow A, the dispensing units will successively dip into liquid material contained within the reservoir B and discharge this material into the passageway 26 and then into conduit 30. In Fig. 1, a portion of a dispensing unit is indicated by dotted lines at 32 in its lowermost position. It will be appreciated from inspection of this dotted line showing that each unit will dip successively into the liquid material within the compartment B and will collect within the open bottom portion of the trough between the sidewalls 20 and 22 an amount of material equal to the volume between the sidewalls and below the tops thereof indicated by the V within the dotted lines. Of course, volume is fixed without depending in any way upon the depth or level of the liquid material within the reservoir as long as there is enough material therein to come above the sides of the trough. This will be true whether the level of the liquid be fairly high as indicated by the dotted line 36 or at a lower level as indicated by the dotted line 38. In either case since the trough is circular and of uniform cross section, the bottom portion of the trough of each unit will contain an amount equal to the volume V at the time the unit is rotated above the level of the liquid in the container B, and this unit volume, it will be readily seen, will travel unaltered along the bottom of the trough as the unit is rotated upwardly.

When each unit 16 starts to approach its uppermost position, the unit volume of liquid material will start to flow outwardly through the opening 24 and the passageway 26 in the hub portion 12. To insure that all of the material so collected in each dipping or dispensing unit 16 will pass out through the opening 24, there is provided in each trough at a location just beyond the location of the opening 24 a dike or partition 40 which extends across the trough from side to side thereof.

From the foregoing description it should be appreciated that even though at times the level of the liquid material within the container may vary appreciably, the unit volume contained within the elongated trough portion of each unit as it moves upwardly above the level of the liquid within the container B will always be the same, and accordingly, the rate of dispensing or metering obtained by the apparatus will depend directly upon the size of the unit volumes being used and the rate at which the shaft and hub are rotated. Obviously, the rate of rotation may be maintained substantially constant by the use of a synchronous motor drive.

In Figs. 3 and 4 a modified dispensing arrangement is disclosed. In the apparatus here disclosed a trough-like dipping member 42 in the shape of a helix or spiral of appreciably more than 360° in length is shown and this spiral has one end portion 42a thereof arranged to dip into a compartment $B_1$ and the other end portion 42b arranged to dip into the compartment $B_2$ as this dipping member is rotated. The result of this modified construction is that, depending upon the direction of rotation, material in one of the compartments may be removed one exact unit amount at a time by the trough-like portion of the helical member 42, and this unit amount of material will then travel along the trough as same is rotated 360° about a supporting shaft 44 to which it is secured and be emptied into the other compartment.

The shaft 44 is supported by a fixed bearing 46 and an opposite end portion of the shaft is provided with a driven wheel 48 having fractional contact with a driving disc 49 carried upon the shaft of a reversible synchronous electric motor 50, preferably of a reduction gear type of conventional construction. As indicated by the double headed arrow D in Fig. 3 this motor 50 and the driving disc 49 may be moved to various portions of adjustment toward and away from the wheel 48 (by means not shown) with the result that the rate of rotation of the shaft 44 may be varied as desired through a relatively wide range. One important difference in this construction over that disclosed by Figs. 1 and 2 is that by reversal of the direction of rotation of the electric motor the accurate metering or dispensing of the liquid from one compartment to another may be readily reversed when desired.

In Figs. 5 and 6 a slightly different construction of dispensing or metering device is shown wherein a dispensing unit 54 in the form of a dipping trough of a length approximately equal to three quarters of a circle is provided and arranged to be rotated by a shaft 56 secured to one sidewall portion thereof. A part of said dispensing or dipping unit extending beyod the point of attachment of the shaft 56 is bent or shaped to extend upwardly and outwardly as indicated at 58. Thus, the metered or measured material collected during each successive rotation of the unit 56 in the direction indicated by the arrow E will be caused to flow along the length of the trough and will be discharged from the open end portion 60 thereof. In this way, the liquid material will be caused to gravitate outwardly and downwardly so as to be discharged from the end 60 in much the same manner as that obtained by the structure of Fig. 1.

In each modification disclosed herein, it will be seen, one or more dispensing or dipping units is employed, and in each instance according to the width of the trough of the dispensing unit, the diameter of the unit thereof and the height of the sidewalls of the trough, a predetermined unit amount of material will be collected each time a unit dips into and out of the material to be dispensed without regard to the level of the supply source. Therefore, for any dispensing unit the rate of withdrawal of material from the supply reservoir or container may be controlled directly by the speed of rotation provided the unit.

Each of the modified forms of dispensing units shown by Figs. 1, 3 and 5 may be made of various different kinds of material (such as stainless steel, plastic or glass) depending upon which is best suited to care for the corrosive and other characteristics of the liquid with which the unit is to be used, and each unit may be made by any of several different known methods of fabrication and assembly including molding, casting and glass-blowing techniques.

Having described the invention, we claim:

1. Apparatus for accurately measuring and dispensing liquid material from a supply container or the like at a preselected uniform volumetric rate even though the level of the liquid material in said container may vary appreciably from time to time, said apparatus comprising a rotatable shaft adapted to be operatively positioned above the normal maximum level of the liquid material in said container, means for rotating said shaft at a preselected constant rate, a dispensing unit carried by said shaft, said unit being in the form of a generally vertically disposed elongated circularly curved member, having a first portion secured to said shaft and a dipping portion extending downwardly therefrom for dipping into said liquid material in said container and for extracting a predetermined unit portion of material therefrom during each revolution of said shaft, said circularly curved member being formed by a bottom wall and a pair of spaced side walls integral therewith so as to define an elongated liquid receiving and transporting trough-like recess of uniform cross sectional area between said spaced side walls, said recess facing inwardly toward the center of said circularly curved member and extending the greater part of the length of said first and dipping portions, whereby an upwardly facing liquid retaining compartment having said predetermined unit volume will be effected between said side walls at the bottom of said recess for all positions of said member while same is being rotated from a lowermost dipping position upwardly and out of said liquid material, means defining a trough-like recess in said first portion arranged to receive said unit volume of liquid material as said dipping portion is moved upwardly toward an upper discharge position, and liquid conducting means communicating with said last named means and extending therefrom to a discharge location laterally disposed relative to the path of rotation of said member, so that liquid material collected from said supply container may be conducted at said preselected rate to a discharge location spaced from material in said supply container regardless of variations in the level of the material in said container.

2. Apparatus for accurately measuring and dispensing liquid material from a supply container or the like at a preselected uniform volumetric rate even though the level of the liquid material in said container may vary appreciably at times, said apparatus comprising a rotatable shaft adapted to be operatively positioned above the normal level of the liquid material in said container, means for rotating said shaft at a selected constant speed, a dispensing unit carried by said shaft and being in the form of a generally vertically disposed elongated member, having a first portion secured to said shaft and a second portion secured to said first portion and extending downwardly therefrom for dipping into said liquid material in said container and for extracting a predetermined unit portion of material therefrom during each revolution of said shaft, said second portion being in the longitudinal direction thereof of at least semi-circular curvature and having spaced side walls and an interconnecting bottom wall defining an elongated liquid receiving and transporting trough-like recess of uniform cross sectional area formed between said spaced side walls thereof, said recess facing inwardly toward the center of said circular curvature and extending the greater part of the length of said second portion, whereby an upwardly facing liquid retaining compartment of constant predetermined unit volume will be effected between said side walls at the bottom of said recess for all positions of said second portion while same is being rotated from a dipping position upwardly and out of said liquid material, means defining a trough-like recess in said first portion arranged to receive said unit volume of liquid material as said second portion is moved upwardly and towards an upper discharge position, and liquid conducting means communicating with said last named means providing the recess in said first portion and extending therefrom to a discharge location laterally disposed relative to the path of rotation of said second portion, so that liquid material collected from said supply container may be conducted at said preselected rate to a discharge location separated from said liquid material in said supply container regardless of said variations in the level of the material in said liquid container.

3. Apparatus for accurately measuring and dispensing liquid material from a supply container or the like at a preselected uniform volumetric rate even though the level of the liquid material in said container may vary appreciably at times, said apparatus comprising a rotatable shaft adapted to be operatively positioned above the normal level of liquid material in said container, means for rotating said shaft at a selected constant speed, a carrier secured to said shaft for rotation thereby, a plurality of dispensing units each being in the form of a generally vertically disposed elongated member, having a first portion secured to said carrier and a second portion secured to said first portion and extending downwardly therefrom for dipping into said liquid material in said container and for extracting a predetermined unit portion of material therefrom during each revolution of said shaft, said second portion being in the longitudinal direction thereof of circular curvature and having spaced side walls and an interconnecting bottom wall defining an elongated liquid receiving and transporting trough-like recess of uniform cross sectional area formed between said spaced side walls thereof, said recess facing inwardly toward the center of said circular curvature and extending the greater part of the length of said second portion, whereby an upwardly facing liquid retaining compartment of constant predetermined unit volume will be effected between said side walls at the bottom of said recess for all positions of said second portion while same is being rotated from a dipping position upwardly and out of said liquid material, means defining a trough-like recess in said first portion arranged to receive said unit volume of liquid material as said second portion is moved upwardly and towards an upper discharge position, and liquid conducting means communicating with each recess in said first portions and extending therefrom to a discharge location laterally disposed relative to the path of rotation of said members, so that liquid material collected from said supply container may be conducted at said predetermined rate to a discharge location separated from said liquid material in said supply container regardless of said variations in the level of the material in said liquid container.

4. Apparatus for accurately measuring and dispensing liquid material from a supply container or the like at a preselected uniform volumetric rate even though the level of the liquid material in said container may vary appreciably at times, said apparatus comprising a rotatable shaft adapted to be operatively positioned above the normal level of the liquid material in said container, means for rotating said shaft at a selected constant speed, a carrier secured to said shaft for rotation thereof, a plurality of dispensing units secured to said carrier for rotation therewith, each unit being in the form of a generally vertically disposed circular member, having a first portion secured to said carrier and a second portion secured to said first portion and extending downwardly therefrom for dipping into said liquid material in said container and for extracting a predetermined unit portion of material therefrom during each revolution of said shaft, said first and second portions having spaced side walls and an interconnecting bottom wall defining a common elongated inwardly facing liquid receiving and transporting trough-like recess of uniform cross sectional area formed between spaced side walls thereof, whereby an upwardly facing liquid retaining compartment of constant predetermined unit volume will be effected between said side walls at the bottom of each of said members for all positions thereof while same are being rotated from a dipping position upwardly and out of said liquid material, and towards an upper discharge position, a transverse dike in each elongated trough-like recess adjacent said first portion, and liquid conducting means communicating with each recess in said first portion and adjacent the dike therein, and extending therefrom to a discharge location laterally disposed relative to the path of rotation of said units, so that liquid material collected from said supply container by said units may be conducted at said preselected rate to a discharge location separated from said liquid material in said supply container regardless of said variations in the level of the material in said liquid container.

5. Reversible apparatus for accurately measuring and dispensing liquid material from one of two supply containers to the other thereof, and at a preselected uniform volumetric rate even though the level of the liquid material in said container may vary appreciably at times, said apparatus comprising a rotatable shaft adapted to be operatively positioned above the normal level of the liquid material in the containers, means for rotating said shaft at a selected constant speed, a dispensing unit carried by said shaft and being in the form of a generally vertically disposed elongated member, having an intermediate portion secured to said shaft and a pair of end portions secured to said intermediate portion and extending downwardly and slightly laterally therefrom for dipping into said containers respectively and into liquid material in one of said containers when same is to be dispensed therefrom, and for extracting a unit portion of the material therefrom during each revolution of said shaft in a predetermined direction, each of said end portions being in the longitudinal direction thereof circularly curved and having spaced side walls and an interconnecting bottom wall defining an elongated inwardly facing liquid receiving and transporting trough-like recess of uniform cross sectional area formed between said spaced side walls thereof, said recesses extending the greater part of the length of each of said end portions and communicating with a connecting recess in said intermediate portion, whereby an upwardly facing liquid retaining compartment of constant predetermined unit volume will be effected between said side walls at the bottom of said trough-like recesses for all dipping positions of said end portions, and thereby liquid material collected from one supply container may be conducted at a preselected rate to the other supply container regardless of said variations in the level of the material in the liquid container from which liquid material is being dispensed.

6. Apparatus for accurately measuring and dispensing liquid material from a supply container or the like at a preselected uniform volumetric rate even though the level of the liquid material in said container may vary appreciably at times, said apparatus comprising a rotatable shaft adapted to be operatively positioned above normal level of the liquid material in said container, means for rotating said shaft at a selected constant speed, a dispensing unit carried by said shaft and being in the form of a generally vertically disposed elongated member, having a first portion integrally secured to said shaft and a second portion integral therewith and extending downwardly therefrom for dipping into said liquid material in said container and for extracting a unit portion of material therefrom during each revolution of said shaft, said second portion being in the longitudinal direction thereof at least semi-circularly curved and having side walls and an interconnecting bottom wall defining an elongated inwardly facing liquid receiving and transporting trough-like recess of uniform cross sectional area formed between said spaced side walls thereof, said recess extending the greater part of the length of said second portion and communicating with a like recess in said first portion, whereby an upwardly facing liquid retaining compartment of constant predetermined unit volume will be effected between said side walls at the bottom of said recess for all positions of said second portion while same is being rotated from a dipping position upwardly and out of said liquid material, and towards an upper discharge position, an integral free end portion of said member extending from said first portion being bent laterally and extending to a discharge location laterally disposed relative to the path of rotation of said second portion and having means providing a trough-like recess therein, so that liquid material collected from said supply container may be conducted at said preselected rate to a discharge location separated from said liquid material in said supply container regardless of said variations in the level of the material in said liquid container.

7. Apparatus for accurately measuring and dispensing liquid material from a supply container or the like at a preselected uniform volumetric rate even though the level of the liquid material in said container may vary appreciably at times, said apparatus comprising a rotatable shaft adapted to be operatively positioned above the normal level of the liquid material in said supply container, means for rotating said shaft at a selected constant speed, a dispensing unit carried by said shaft and being in the form of an elongated member, having a first attachment portion secured to said shaft, a second dipping portion extending downwardly therefrom for extracting a unit portion of liquid material from said supply container during each complete revolution of said shaft, and a third free end portion extending laterally from the attachment portion for directing extracted liquid to a discharge conduit or the like spaced from the liquid supply in said container, said second portion being in the longitudinal direction thereof at least semi-circularly curved and disposed generally in a vertical plane and having spaced side walls and an interconnecting bottom wall defining an elongated inwardly facing liquid receiving and transporting trough-like recess of uniform cross sectional area formed between said spaced side walls thereof, said recess extending the greater part of the length of said dipping portion, whereby an upwardly facing liquid retaining compartment of constant predetermined unit volume will be effected between said side walls at the bottom of said recess for all positions of said dipping portion while same is rotated upwardly and out of said liquid material, and towards a discharge position, and means providing communicating trough-like recesses in said first and third portions, whereby liquid material collected from said supply container may be conducted at said selected rate along said communicating recesses to said discharge conduit regardless of said variations in the level of the material in said supply container.

References Cited in the file of this patent
UNITED STATES PATENTS

| | | |
|---|---|---|
| 789,116 | Brough | May 2, 1905 |
| 1,284,700 | Johnson | Nov. 12, 1918 |
| 1,826,346 | Guermont | Oct. 6, 1931 |
| 1,929,693 | Jones et al. | Oct. 10, 1933 |
| 2,319,830 | Sampsel | May 25, 1943 |